United States Patent Office 2,744,096
Patented May 1, 1956

2,744,096

CROSS-LINKED POLYESTERS FROM p,p'-SULFONYL DIBENZOIC ACID AND AN UNSATURATED ALIPHATIC DIBASIC ACID CONDENSED WITH A GLYCOL

John R. Caldwell, Kingsport, Tenn., assignor to Eastman Kodak Company, Rochester, N. Y., a corporation of New Jersey No Drawing. Application October 3, 1952, Serial No. 313,068

24 Claims. (Cl. 260—75)

This application relates to valuable interpolyesters prepared by condensing a p,p'-sulfonyl dibenzoic acid compound in conjunction with an unsaturated aliphatic dibasic acid, anhydride or diester with a glycol.

It is an object of this invention to provide novel polyesters as described herein. It is another object of this invention to provide a process as described herein for preparing valuable polyesters. Other objects will become apparent hereinafter.

This application is a continuation in part in my copending application Serial No. 143,494, filed February 10, 1950, now U. S. Patent No. 2,614,120, dated October 14, 1952. In that application sulfonyl dibenzoic acid is called bis(dicarboxy diphenylsulfone).

Interpolyesters of terephthalic acid and various other dibasic acids condensed with glycols have been described in the prior art. However, such known polyesters do not possess the herein described highly advantageous properties of my novel polyesters.

I have found that p,p'-sulfonyl dibenzoic acid or its esters or its acid chloride plus an unsaturated aliphatic dibasic acid of the type described below can be condensed with a polymethylene glycol and/or an aliphatic ether glycol to produce a new kind of interpolyester having highly valuable properties which are superior to those of the polyesters described in the prior art. My novel interpolyesters will cross-link and form insoluble products when exposed to oxygen and/or heat. They can be employed in their incompletely cross-linked, soluble form in the preparation of protective coating materials such as varnishes, lacquers, baking enamels, etc., whereby finishes are obtained that are exceptionally hard and resistant to scratching and marking. These novel cross-linked polyester coatings are insoluble in common solvents and are tough and flexible. They also have excellent resistance to water. Moreover, the novel interpolyesters in their soluble form can be incorporated with drying oils, alkyd resins, etc. as modifiers.

My novel interpolyesters may contain as constituents thereof significant percentages of the m,m' and/or the m,p'-isomers of the p,p'-sulfonyl dibenzoic acid without significant deleterious effect on the properties of these interpolyesters. In fact, when the interpolyester is to be employed for many of the purposes to which it is suited, substantial quantities of these isomers can be incorporated into the interpolyester.

One embodiment of this invention relates to a process for preparing an incompletely cross-linked, soluble interpolyester comprising (A) condensing a combination of dibasic acidic compounds containing from about 10 to about 90 mol percent of a p,p'-sulfonyl dibenzoic acid diester having the formula:

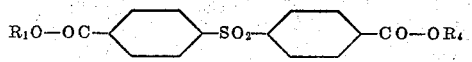

wherein $R_1$ and $R_4$ each represents a substituent selected from the group consisting of β-hydroxylalkyl radical containing from 2 to 4 carbon atoms, an omega-hydroxylalkyl radical containing from 3 to 12 carbon atoms and an alkyl radical containing from 1 to 6 carbon atoms, and conversely from about 90 to 10 mol percent of an unsaturated aliphatic dibasic acidic compound selected from the group consisting of maleic acid, maleic anhydride, maleic esters, fumaric acid, fumaric esters, itaconic acid, itaconic anhydride and itaconic esters, which unsaturated dibasic acid esters are derived from alkanols containing from 1 to 4 carbon atoms, (B) with a dioxy compound selected from the group consisting of those compounds having the following formulas:

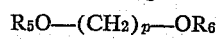

and

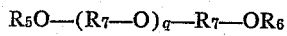

wherein $p$ represents a positive integer from 2 to 12, $R_5$ and $R_6$ each represents a substituent selected from the group consisting of a hydrogen atom and an acyl radical containing from 2 to 4 carbon atoms, $R_7$ represents an alkylene radical containing from 2 to 4 carbon atoms and $q$ represents a positive integer of from 1 to 10 inclusive, the dioxy compound being employed in such a proportion that there is substantially an equivalent amount of oxy substituents in proportion to the carbalkoxy substituents in the overall combination of the dibasic acidic compounds and the dioxy compounds, (C) in the presence of a condensing agent selected from the group consisting of the alkali metals, the alkaline earth metals, and oxides of these two groups of metals, the alkoxides containing from 1 to 6 carbon atoms of these two groups of metals, the carbonates and borates of these two groups of metals, litharge, and compounds having the following formulas:

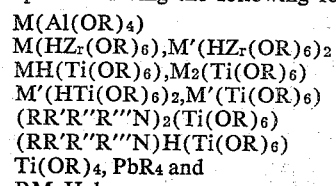

wherein M represents an alkali metal, M' represents an alkaline earth metal selected from the group consisting of magnesium, calcium and strontium, R represents an alkyl group containing from 1 to 6 carbon atoms, R', R" and R'" each represents a member of the group consisting of R and an aryl group of the benzene series containing from 6 to 9 carbon atoms and Hal represents a halogen atom, (D) at an elevated temperature of from about 150° to about 250° C., (E) the condensation being conducted in an inert atmosphere with agitation.

When an alkyl diester of p,p'-sulfonyl dibenzoic acid as described under (A) above is employed as the starting material, it is advantageously first reacted with a dioxy compound as described under (B) above at an elevated temperature, after which preliminary step, this preliminary product (an omega-hydroxyalkyl diester) is then reacted with the unsaturated aliphatic dibasic acidic compound described under (A) in the presence of a condensing agent as described under (C) and the condensation is completed as defined under (D), (E), and (F). Advantageously the elevated temperature employed during the preliminary step is substantially that at which reflux conditions subsist; however, higher and lower temperatures can also be employed. By employing this preliminary step the p,p'-sulfonyl dibenzoic acid alkyl diester is converted into a glycol ester (viz. an omega-hydroxyalkyl ester) or a low molecular weight polyester containing free hydroxy groups; this product is more readily susceptible to reaction with the unsaturated aliphatic dibasic acidic compound than is the alkyl diester.

The dioxy compounds defined hereinabove may not actually contain any free hydroxy radicals since they may be in esterified form as indicated by the formulas given. However, these hydroxy or substitued hydroxy radicals are referred to generically as oxy radicals or substituents. The dioxy compounds which can be employed in accordance with this invention are most advantageously dihydroxy compounds; such compounds will hereinafter be referred to as dihydroxy compounds although it is to be understood that dioxy compounds of the type described above are intended to be covered by this term. Each of the dibasic acidic compounds defined under (A) above is considered as containing 2 carbalkoxy radicals as that term is employed in the definition of the process as described above even though free acids, anhydrides, or esters are included within the scope of the term.

In addition to employing the preliminary step for converting the alkyl esters to omega-hydroxyalkyl esters, this same preliminary step can be applied to converting the free p,p'-sulfonyl dibasic acid to its omega-hydroxyalkyl ester.

The polymethylene glycols which can be employed in accordance with this invention are straight-chain alkane diols, viz. polymethylene glycols, wherein the hydroxy radicals are positioned at the two ends of the alkylene chain. Examples of such glycols include ethylene glycol, 1,3-propylene glycol, tetramethylene glycol, octamethylene glycol, dodecamethylene glycol etc. As indicated above, mono or diesters of these glycols can also be employed thus, the acetates, propanates, and butyrates are examples of such esters. The defined ether glycols can be employed either in lieu of the polymethylene glycols or in conjunction therewith. Examples of ether glycols include diethylene glycol, triethylene glycol, tetraethylene glycol, bis (4-hydroxybutyl) ether, bis (3-hydroxypropyl) ether, etc. Advantageously the aliphatic ether glycols employed contain no more than 2 ether linkages, i. e. $q$ is 1 or 2.

The catalytic condensing agents which can be employed have been described above. From about 0.005% to about 0.2% of such catalysts based on the weight of the dibasic acidic compounds being condensed can be employed. Higher or lower percentages can also be employed. Generally, from about 0.01% to about 0.06% of the catalytic condensing agent can be advantageously employed.

The temperatures at whcih polyesterification can be conducted is dependent upon the specific reactants involved in any given condensation reation. In general, the reaction mixture can be heated with agitation at from about 150° to about 220° C. for from approximately 2 to 6 hours. When one of the preferred omega-hydroxy alkyldiesters of p,p'-sulfonyl dibenzoic acid is being prepared by the described preliminary step beginning with the free acid or alkyl esther, the heating is advantageously conducted until the evolution of water or alcohol is practically complete after which the dibasic acidic compound and a catalyst are added and heating is continued at a temperature which is advantageously in excess about of 200° C. for an additional 2 or 3 hours. The application of heat is accompanied with good agitation and is performed under an inert atmosphere. These conditions can be varied depending upon the degree of polyesterification desirable, the ultimate properties sought, the stability of the polyester being produced, and the use for which the product is intended.

It is important to exclude oxygen and moisture at all stages of the condensation reaction. Inert atmospheres which can be advantageously employed include nitrogen, oxygen, helium etc. Substantially anhydrous reactants can be advantageously employed although this is not essential especially if any water is removed in the earlier stages of the condensation.

The reaction can be carried out in the presence or absence of a solvent. Inert, high boiling compounds such as diphenyl ether, diphenyl, mixed tolyl sulfones, chlorinated naphthalene, chlorinated diphenyl, dimethylsulfolane, etc. can be used as the reaction medium.

As indicated above the acidic compounds can be employed in the form of their diesters, these diesters can be prepared by conventional means. The beta-hydroxy alkyl diesters of sulfonyl dibenzoic acid can be prepared as described in my parent application employing an alkylene oxide. The acid chlorides can be employed in some cases although the conditions involved are generally substantially different.

Examples of the various diesters which can be employed are given in the examples set forth hereinbelow and include the ethyl, propyl, n-butyl, sec-butyl, isopropyl, sec-amyl, n-hexyl, 10-hydroxydecyl, 5-hydroxyamyl, 12-hydroxydodecyl, 2-hydroxyethyl, etc. diesters of any of the dibasic acidic compounds described hereinabove.

As far as is known, any of the catalytic condensing agents known in the prior art can be advantageously used; moreover it has been found that certain novel catalysts also give advantageous results provided the dibasic acidic compounds used are esters. Such catalysts are described in copending applications filed on even date herewith. See Caldwell Serial No. 313,072, Serial No. 313,078, Caldwell and Reynolds Serial No. 313,077, Wellman and Caldwell Serial No. 313,074, Serial No. 313,075, and Serial No. 313,076, and Wellman Serial No. 313,073, which applications give a description of such novel catalytic condensing agents.

As indicated hereinabove some of the isomers of p,p'-sulfonyl dibenzoic acid and/or its esters can be employed. Moreover, homologs of p,p'-sulfonyl dibenzoic acid can also be employed, e. g. m,m'dimethyl-p,p'-sulfonyl dibenzoic acid, o-ethyl-p,p'-sulfonyl dibenzoic acid, m-methyl-o-propyl-p,p'-sulfonyl dibenzoic acid, etc. Fairly substantial proportions of the various diesters of such isomers and homologs can be employed in substitution for a corresponding quantity of the diester of p,p'-sulfonyl dibenzoic acid.

The unsaturated aliphatic dibasic acidic compounds employed in accordance with the process described above can be partially replaced by other dibasic acidic compounds which include o-phthalic, isophthalic, linoleic, adipic, sebacic, succinic, suberic, and terephthalic acids, et cetera. In addition to the replacement of a portion of the unsaturated aliphatic dibasic acid, modifiers can also be incorporated into the interpolyester products of this invention, e. g. the fatty acids of soybean oil, linseed oil, tung oil, cottonseed oil, etc.

The products obtained as described above are generally viscous, semi-solid materials of gum-like nature when cool. These products are soluble in various solvents such as acetone, dioxane, various alcohols such as ethyl alcohol, various esters such as ethyl acetate, butyl acetate, toluene, ethylene dichloride, etc.

The soluble interpolyester products which can be prepared as described above can be converted into crosslinked, insoluble, infusible, resinous products by heating in the presense of a gas containing free oxygen (e. g. air or oxygen) to a temperature of about 200° to about 300° C. or higher for several hours; however, it is more advantageous to accomplish the same result by adding a catalyst to facilitate the conversion to an infusible thermosetting resinous product. Catalysts which can be employed for this purpose are those which are well known in the art of preparing alkyd or glyptal resins and include compounds such as cobalt salts, manganese salts, lead salts (napththenates, oleates, etc.), various acyl peroxides such as lauroyl peroxide, benzoyl peroxide, oleoyl peroxide, and various other peroxy compounds. When employing such catalysts, the heating in the presence of air or oxygen can be conducted for relatively short times (from a few minutes to a couple of hours) at relatively low temperatures such as 100–150° C.

The soluble interpolyesters prepared in accordance with the processes described above can be intermixed with various alkyd resins such as glycerine-phthalic acid resins, etc. They can also be admixed with phenol-formaldehyde resins, etc. The number of such combinations is innumerable and the products which can be obtained can be varied in accordance with the properties of the modifying agents employed. Many types of valuable protective coatings can be thereby obtained. Valuable protective coatings such as varnishes can be obtained by mixing the soluble interpolyester products prepared as described above with various drying oils such as linseed oil, tung oil, etc.

This invention can be further illustrated by the following examples; in addition to these examples it is apparent that other variations and modifications thereof can be adapted to obtain similar results:

*Example 1.—Soluble polyester from maleic anhydride and diethylene glycol*

420 grams (1 mole) of p,p'-sulfonyl dibenzoic acid dibutyl ester and 424 grams (4 moles) of diethylene glycol were placed in a reaction vessel equipped with a stirrer, a short distillation column, and an inlet for purified hydrogen. A solution of 0.5 gram of sodium butoxide in 10 cc. of butyl alcohol was added as a catalyst. This mixture was stirred at 200–210° C. until 130–140 grams of butyl alcohol had distilled off, thereby indicating that the p,p'-sulfonyl dibenzoic acid had been converted to the diethylene glycol ester. 300 grams (3 moles) of maleic anhydride was added and heating was continued for 2 hours. The polyester obtained is a viscous, semi-solid material of gum-like consistency when cool. It is soluble in acetone, alcohol, ethyl acetate, and similar solvents.

*Example 2.—Film from polyester of Example 1*

A solution of 10 grams of the soluble polyester of Example 1, 0.1 gram of manganese oleate, and 50 cc. of acetone was coated on a glass plate. The solvent was evaporated and the resulting residue film was baked for 2 hours at 120° C. The film obtained is insoluble in acetone and unaffected by boiling water. It shows excellent adhesion to the glass.

*Example 3.—Film from polyester of Example 1*

A solution of 10 grams of the soluble polyester product of Example 1, 0.2 gram (2%) of benzoyl peroxide, and 50 cc. of acetone was coated on a glass plate. The solvent was evaporated and the resultant film heated for 3 hours at 110–120° C. The film obtained is insoluble in acetone, unaffected by boiling water and shows excellent adhesion to the glass.

*Example 4.—Soluble polyester from maleic anhydride and ethylene glycol modified with phthalic anhydride*

372 grams (1 mole) of p,p'-sulfonyl dibenzoic acid diethyl ester and 248 grams (4 moles) of ethylene glycol were placed in a reaction vessel as described in Example 1. A solution of 0.3 gram of lithium ethoxide in ethyl alcohol was added as a catalyst. This mixture was stirred at 180–190° C. in an atmosphere of purified nitrogen until the evolution of ethyl alcohol was practically complete. 200 grams (2.0 moles) of maleic anhydride and 148 grams (1 mole) of phthalic anhydride were then added. The mixture was then heated at 180–190° C. for 30 minutes and the temperature was raised to 210–220° C. where it was held for 1 hour. The polyester product obtained is soluble in acetone, dioxane, ethyl acetate and ethylene dichloride. This product resembled that obtained in Example 1.

*Example 5.—Film from polyester of Example 4*

10 grams of the soluble polyester of Example 4 and 0.2 gram of cobalt naphthenate were dissolved in 30 cc. of ethylene dichloride. A film was then coated on a metal plate and heated for one hour at 130° C. The resultant film is insoluble in ethylene dichloride and shows good adhesion to the metal surface.

*Example 6.—Soluble polyester from maleic anhydride and hexamethylene glycol modified with sebacic acid*

372 grams (1 mole) of p,p'-sulfonyl dibenzoic acid diethyl ester and 360 grams (3 moles) of hexamethylene glycol were placed in a reaction vessel as described in Example 1. A piece of magnesium ribbon weighing about 0.2 gram was activated by heating in iodine vapors and added as a catalyst. The mixture was stirred at 200–210° C. until the evolution of alcohol had practically come to a stop. 100 grams (1 mole) of maleic anhydride and 202 grams (1 mole) of sebacic acid were added. The temperature was maintained for an additional 3 hours. The polyester product obtained is soluble in dioxane, butyl acetate, toluene, and ethylene dichloride. Its properties were similar to those of the product of Examples 1 and 4.

*Example 7.—Film from polyester of Example 6*

A film was prepared employing the soluble polyester described in Example 6 by dissolving it in dioxane and incorporating therein 2% weight of the polyester of cobalt naphthenate followed by coating the solution on a brass plate. The film was baked for 30 minutes at 120–140° C. The film obtained showed especially good resistance to water. A similar film was obtained employing an equivalent quantity of manganese oleate in lieu of the cobalt naphthenate.

*Example 8.—Soluble polyester from fumaric acid and diethylene glycol modified with linseed oil fatty acids*

420 grams (1 mole) of p,p'-sulfonyl dibenzoic acid dibutyl ester and 212 grams (2 moles) of diethylene glycol were heated in the presence of 0.2 gram of litharge as a catalyst to form the glycol ester employing apparatus as described in Example 1 in accordance with the procedure set forth therein. When the diethylene glycol ester had formed, 58 grams (0.5 mole) of fumaric acid and 140 grams (0.5 mole) of linseed oil fatty acids were added. Heating was continued at 210–220° C. for 3 hours. A viscous soluble polyester product was obtained.

*Example 9.—Film from polyester of Example 8*

Employing the procedure of Example 7, a film was prepared from the soluble polyester product of Example 9 which was highly water resistant when baked at 120–130° C. for 1 hour. A similar film was obtained employing 2% lead naphthenate as the catalyst.

*Example 10.—Soluble polyester from maleic acid and tetramethylene glycol modified with phthalic acid*

1 gram mole of the omega-hydroxybutyl diester of p,p'-sulfonyl dibenzoic acid was prepared employing the apparatus described in Example 1 in accordance with the procedure set forth therein except that 4 gram moles of tetramethylene glycol was used in lieu of the diethylene glycol. After this preliminary step, the acidic compounds added were 1.3 gram moles of maleic acid and 1.7 gram moles of phthalic acid in lieu of the 3.0 moles of maleic anhydride employed in Example 1. The polyester obtained was a soluble material similar to that described in Example 1.

*Example 11.—Film from polyester of Example 10*

A solution of the soluble polyester product of Example 10 in acetone was prepared incorporating 2% by weight of the polyester of manganese oleate. A film was prepared from the solution and baked at 140–150° C. for 30 minutes. The film obtained is insoluble, unaffected by boiling water and highly resistant to scratching or chipping.

*Example 12.—Soluble polyester from maleic anhydride and tetramethylene glycol modified with itaconic acid*

1 gram mole of the omega-hydroxybutyl diester of p,p'-sulfonyl dibenzoic acid was prepared in a manner similar to that described in Example 10 by employing 4 gram moles of tetramethylene glycol. A mixture of 1.3 gram moles of maleic anhydride and 1.7 gram moles of itaconic acid was added and heating was continued until a soluble polyester product was obtained in the manner described in Example 10.

*Example 13.—Film from polyester of Example 12*

A solution of the soluble polyester product of Example 12 in acetone was prepared incorporating 2% by weight of the polyester of lauroyl peroxide. A film was prepared from the solution and baked at 140–150° C. for 30 minutes. The film obtained is insoluble, unaffected by boiling water and highly resistant to scratching or chipping.

*Example 14.—Soluble polyester from maleic acid and tetramethylene glycol modified with itaconic anhydride*

1 gram mole of the omega-hydroxybutyl diester of p,p'-sulfonyl dibenzoic acid was prepared in a manner similar to that described in Example 1 by employing 4 gram moles of tetramethylene glycol. A mixture of 1.7 gram moles of maleic acid and 1.3 gram moles of itaconic anhydride was added and heating was continued until a soluble polyester product was obtained in the manner described in Example 10.

*Example 15.—Film from polyester of Example 14*

A solution of the soluble polyester product of Example 14 in dioxane was prepared incorporating 2% by weight of the polyester of acetyl benzoyl peroxide. A film was prepared from the solution and baked at 140–150° C. for 30 minutes. The film obtained is insoluble, unaffected by boiling water nad highly resistant to scratching or chipping.

*Example 16.—Soluble polyester from maleic acid and ethylene glycol modified with sebacic acid*

1 gram mole of the omega-hydroxyethyl diester of p,p'-sulfonyl dibenzoic acid was prepared in a manner similar to that described in Example 1 by employing 4 gram moles of ethylene glycol. A mixture of 1.5 gram moles of maleic acid and 1.5 gram moles of sebacic acid was added and heating was continued until a soluble polyester product was obtained in the manner described in Example 1.

*Example 17.—Film from polyester of Example 16*

A solution of the soluble polyester product of Example 15 in ethylene dichloride was prepared incorporating 2% by weight of the polyester of manganese oleate. A film was prepared from the solution and baked at 140–150° C. for 30 minutes. The film obtained is insoluble, unaffected by boiling water and highly resistant to scratching or chipping.

In addition to the acidic compounds employed in the above examples, any of those set forth in the general description can be used. Maleic acid and maleic anhydride are the generally preferred unsaturated acidic compounds.

I claim:

1. A process for preparing an incompletely cross-linked, soluble interpolyester comprising (A) condensing a combination of dibasic acidic compounds containing from about 10 to about 90 mole percent of a p,p'-sulfonyl dibenzoic acid diester having the formula:

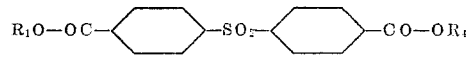

wherein $R_1$ and $R_4$ each represents a substituent selected from the group consisting of β-hydroxyalkyl radical containing from 2 to 4 carbon atoms, and omega-hydroxyalkyl radical containing from 3 to 12 carbon atoms and an alkyl radical containing from 1 to 6 carbon atoms, and conversely from about 90 to 10 mole percent of an unsaturated aliphatic dibasic acid selected from the group consisting of maleic acid, maleic anhydride, maleic esters, fumaric acid, fumaric esters, itaconic acid, itaconic anhydride and itaconic esters, which unsaturated dibasic acid esters are derived from alkanols containing from 1 to 4 carbon atoms, (B) with a dioxy compound selected from the group consisting of those compounds having the following formulas:

and

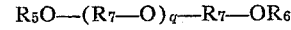

wherein $p$ represents a positive integer from 2 to 12, $R_5$ and $R_6$ each represents a substituent selected from the group consisting of a hydrogen atom and an acyl radical containing from 2 to 4 carbon atoms, $R_7$ represents an alkylene radical containing from 2 to 4 carbon atoms and $q$ represents a positive integer of from 1 to 10 inclusive, the dioxy compound being employed in such a proportion that there is substantially an equivalent amount of oxy substituents in proportion to the carbalkoxy substituents in the overall combination of the dibasic acidic compounds and the dioxy compounds, (C) in the presence of a condensing agent selected from the group consisting of the alkali metals, the alkaline earth metals, the oxides of these two groups of metals, the alkoxides containing from 1 to 6 carbon atoms of these two groups of metals, the carbonates and borates of these two groups of metals and litharge, (D) at an elevated temperature of from about 150° C. to about 250° C., (E) the condensation being conducted in an inert atmosphere with agitation.

2. A process as defined in claim 1 wherein the elevated temperature is from about 150° to about 250° C.

3. A process as defined in claim 2 wherein the condensing agent is employed in an amount of from about 0.005% to about 2% based on the weight of the combined acidic compounds employed.

4. A process as defined in claim 3 wherein all materials employed in the process as substantially anhydrous.

5. A process as defined in claim 4 wherein the unsaturated aliphatic dibasic acidic compound is maleic anhydride and the dioxy compound is diethylene glycol.

6. A process as defined in claim 4 wherein the unsaturated aliphatic dibasic acidic compound is maleic anhydride and the dioxy compound is ethylene glycol.

7. A process as defined in claim 4 wherein the unsaturated aliphatic dibasic acidic compound is maleic anhydride and the dioxy compound is hexamethylene glycol.

8. A process as defined in claim 4 wherein the unsaturated aliphatic dibasic acidic compound is fumaric acid and the dioxy compound is diethylene glycol.

9. A process as defined in claim 4 wherein the unsaturated aliphatic dibasic acidic compound is maleic anhydride and the dioxy compound is tetramethylene glycol.

10. A process as defined in claim 1 wherein the sulfonyl dibenzoic diester is an omega-hydroxyalkyl diester formed by a preliminary step comprising condensing a dialkyl ester of p,p'-sulfonyl dibenzoic acid wherein the alkyl radical contains from 1 to 6 carbon atoms with an excess of a dioxy compound which is defined under (B) at an elevated temperature until the alkyl diester is substantially converted to the omega-hydroxyalkyl diester, after which preliminary step the condensing agent which is defined under (C) is added along with an unsaturated aliphatic dibasic acid as defined under (A), the excess of the dioxy compound initially added being such that there is at least an equivalent amount of oxy substituents in proportion to the carbalkoxy substituents in the final overall combination of the dibasic acidic compounds and the dioxy compound, whereupon the condensation is completed as defined under (D), (E), (F).

11. A process as defined in claim 10 wherein the preliminary elevated temperature is substantially that at which reflux conditions subsist thereby facilitating the removal of alkanol, the subsequent condensation being conducted at an increased temperature up to about 250° C.

12. A process as defined in claim 11 wherein the condensing agent is employed in an amount of from about 0.005% to about 0.2% based on the weight of the combined dibasic acidic compounds employed.

13. An incompletely cross-linked, soluble polyester prepared in accordance with the process defined in claim 1.

14. An infusible, cross-linked, insoluble polyester prepared by heating the polyester defined by claim 13 in the presence of a gas containing free oxygen.

15. An incompletely cross-linked, soluble polyester prepared as defined by claim 5.

16. A nonfusible, cross-linked, insoluble polyester prepared by heating the polyester defined by claim 15 in the presence of a gas containing free oxygen.

17. An incompletely cross-linked soluble polyester prepared as defined by claim 6.

18. A nonfusible, cross-linked, insoluble polyester prepared by heating the polyester defined by claim 17 in the presence of a gas containing free oxygen.

19. An incompletely cross-linked, soluble polyester prepared as defined by claim 7.

20. A nonfusible, cross-linked, insoluble polyester prepared by heating the polyester defined by claim 19 in the presence of a gas containing free oxygen.

21. An incompletely cross-linked soluble polyester prepared as defined by claim 8.

22. A nonfusible, cross-linked, insoluble polyester prepared by heating the polyester defined by claim 21 in the presence of a gas containing free oxygen.

23. An incompletely cross-linked insoluble polyester prepared as defined by claim 9.

24. A nonfusible, cross-linked, insoluble polyester prepared by heating the polyester defined by claim 23 in the presence of a gas containing free oxygen.

References Cited in the file of this patent

UNITED STATES PATENTS

| | | |
|---|---|---|
| 2,437,046 | Rothrock et al. | Mar. 2, 1948 |
| 2,465,319 | Winfield et al. | Mar. 22, 1949 |
| 2,547,113 | Drewitt et al. | Apr. 3, 1951 |
| 2,657,194 | Butler et al. | Oct. 27, 1953 |

FOREIGN PATENTS

| | | |
|---|---|---|
| 621,977 | Great Britain | Apr. 25, 1949 |